(12) United States Patent
Yang et al.

(10) Patent No.: US 10,312,509 B2
(45) Date of Patent: Jun. 4, 2019

(54) ELECTRODE ADDITIVE AND AN ELECTRODE COMPRISING SAID ELECTRODE ADDITIVE

(71) Applicants: Robert Bosch GmbH, Stuttgart (DE); Institute of Chemistry, Chinese Academy of Sciences, Beijing (CN)

(72) Inventors: Chunpeng Yang, Shanghai (CN); NaHong Zhao, Shanghai (CN); Yuguo Guo, Shanghai (CN); Yunhua Chen, Shanghai (CN); Eric Zhang, Shanghai (CN); Yaxia Yin, Shanghai (CN)

(73) Assignees: Robert Bosch GmbH, Stuttgart (DE); Institute of Chemistry, Chinese Academy of Sciences, Beijing (CN)

( * ) Notice: Subject to any disclaimer, the term of this patent is extended or adjusted under 35 U.S.C. 154(b) by 88 days.

(21) Appl. No.: 15/525,131

(22) PCT Filed: Nov. 10, 2014

(86) PCT No.: PCT/CN2014/090714
§ 371 (c)(1),
(2) Date: May 8, 2017

(87) PCT Pub. No.: WO2016/074129
PCT Pub. Date: May 19, 2016

(65) Prior Publication Data
US 2018/0277837 A1    Sep. 27, 2018

(51) Int. Cl.
*H01M 4/136*  (2010.01)
*H01M 4/36*   (2006.01)
(Continued)

(52) U.S. Cl.
CPC .......... *H01M 4/366* (2013.01); *H01M 4/136* (2013.01); *H01M 4/38* (2013.01); *H01M 4/625* (2013.01);
(Continued)

(58) Field of Classification Search
CPC ............ H01M 4/366; H01M 10/0525; H01M 10/054; H01M 4/136; H01M 4/625; H01M 4/38; Y10S 977/948; B82Y 30/00
See application file for complete search history.

(56) References Cited

U.S. PATENT DOCUMENTS

2011/0151335 A1*  6/2011  Deromelaere ........ H01M 4/136
                                                         429/304
2012/0264017 A1* 10/2012  Nazri .................. H01M 4/0423
                                                         429/218.1
(Continued)

FOREIGN PATENT DOCUMENTS

| CN | 101953001 | 1/2011 |
| CN | 102738448 | 10/2012 |

OTHER PUBLICATIONS

International Search Report for Application No. PCT/CN2014/090714 dated Jul. 29, 2015 (2 pages).
(Continued)

*Primary Examiner* — Stewart A Fraser
(74) *Attorney, Agent, or Firm* — Michael Best & Friedrich LLP

(57) ABSTRACT

An electrode additive comprising an electrochemically active material in a form of one-dimensional molecular chain is disclosed wherein the electrochemically active material is contained inside a nanotube-formed conductive shell material. An electrode comprising said electrode additive, and the uses of said electrode additive and said electrode are also disclosed.

11 Claims, 3 Drawing Sheets

(51) Int. Cl.
*H01M 4/38* (2006.01)
*H01M 4/62* (2006.01)
*H01M 10/054* (2010.01)
*H01M 10/0525* (2010.01)
*H01M 4/485* (2010.01)
*H01M 10/052* (2010.01)
*B82Y 30/00* (2011.01)
*B82Y 40/00* (2011.01)

(52) U.S. Cl.
CPC ..... *H01M 10/054* (2013.01); *H01M 10/0525* (2013.01); *B82Y 30/00* (2013.01); *B82Y 40/00* (2013.01); *H01M 4/364* (2013.01); *H01M 4/386* (2013.01); *H01M 4/485* (2013.01); *H01M 10/052* (2013.01); *Y10S 977/744* (2013.01); *Y10S 977/846* (2013.01); *Y10S 977/948* (2013.01)

(56) References Cited

U.S. PATENT DOCUMENTS

2013/0209880 A1* 8/2013 Nozue ................. H01M 4/1393
                                                              429/211
2013/0224594 A1* 8/2013 Yushin ................... H01M 4/38
                                                              429/218.1
2013/0302697 A1* 11/2013 Wang ..................... B82Y 30/00
                                                              429/300

OTHER PUBLICATIONS

Fujimori, T. et al., "Conducting linear chains of sulphur inside carbon nanotubes," Nature Communications, No. Article No. 3162, Jul. 12, 2013. abstract, pp. 2, 4-5.

Ajayan, P.M. et al., "Opening carbon nanotubes with oxygen and implications for filling," Nature, vol. 362, Apr. 8, 1993.

* cited by examiner

ELECTRODE ADDITIVE AND AN ELECTRODE COMPRISING SAID ELECTRODE ADDITIVE

BACKGROUND OF THE INVENTION

The present invention relates to an electrode additive comprising an electrochemically active material in a form of one-dimensional molecular chain, wherein the electrochemically active material is contained inside a nanotube-formed conductive shell material. The present invention further relates to an electrode comprising said electrode additive, and the uses of said electrode additive and said electrode.

Owing to the high capacity, low cost, and abundant features, sulfur used as the cathode of lithium batteries has long fascinated the scientific community. Orthorhombic $S_8$ is the most stable allotrope and widely used in the current Li—S batteries. However, $S_8$ is insulating and a conventional Li—S battery based on cyclic $S_8$ molecules usually discharges according to the two-electron reaction $\frac{1}{8}S_8 + 2Li^+ + 2e^- \leftrightarrow Li_2S$, which brings about two plateaus. Since the polysulfides generated in the discharge process may be dissolved into the electrolyte and then deposited onto the lithium anode during the charge process, the sulfur cathode may suffer from a severe capacity fade.

Some former researches have found that one-dimensional chain-like sulfur as another allotrope shows a distinct electrochemical behavior, but it is instable in structure and therefore cannot exist independently.

SUMMARY OF THE INVENTION

The inventors of the present invention have investigated the chain-like sulfur, and found that one-dimensional sulfur chain confined in a carbon nanotube shows a structural stability, and also found synergistic effects of the chain-like sulfur with a distinct electrochemical activity and the carbon nanotube with a good electrical conductivity in which the chain-like sulfur is confined, as the electrical conductivity of the carbon nanotube can be further enhanced by the chain-like sulfur. The inventors of the present invention have further found a novel electrode additive application for this material, in which the electrode additive is made by one-dimensional sulfur chain confined in a carbon nanotube and can be used in an energy storage system and/or an energy conversion system. Moreover, the inventors of the present invention also believe that the element sulfur mentioned here can be extended to other chalcogen elements, such as selenium and tellurium, on account of their similarity in electrochemical behaviors.

It is therefore an object of the present invention to find a stable state of chalcogen elements in a form of one-dimensional molecular chain, and develop the promising electrochemical applications thereof.

Said object can be achieved by an electrode additive comprising an electrochemically active material in a form of one-dimensional molecular chain, wherein the electrochemically active material is contained inside a nanotube-formed conductive shell material.

According to another aspect of the present invention, an electrode is provided, which comprises the electrode additive according to the present invention.

According to another aspect of the present invention, a battery is provided, which comprises the electrode according to the present invention.

The present invention further provides the use of the electrode additive according to the present invention in an energy storage system or an energy conversion system, preferably in a lithium battery or a sodium battery.

The present invention further provides the use of the electrode according to the present invention in an energy storage system or an energy conversion system, preferably in a lithium battery or a sodium battery.

BRIEF DESCRIPTION OF THE DRAWINGS

Each aspect of the present invention will be illustrated in more detail in conjunction with the accompanying drawings, wherein.

DETAILED DESCRIPTION

Figure 1:
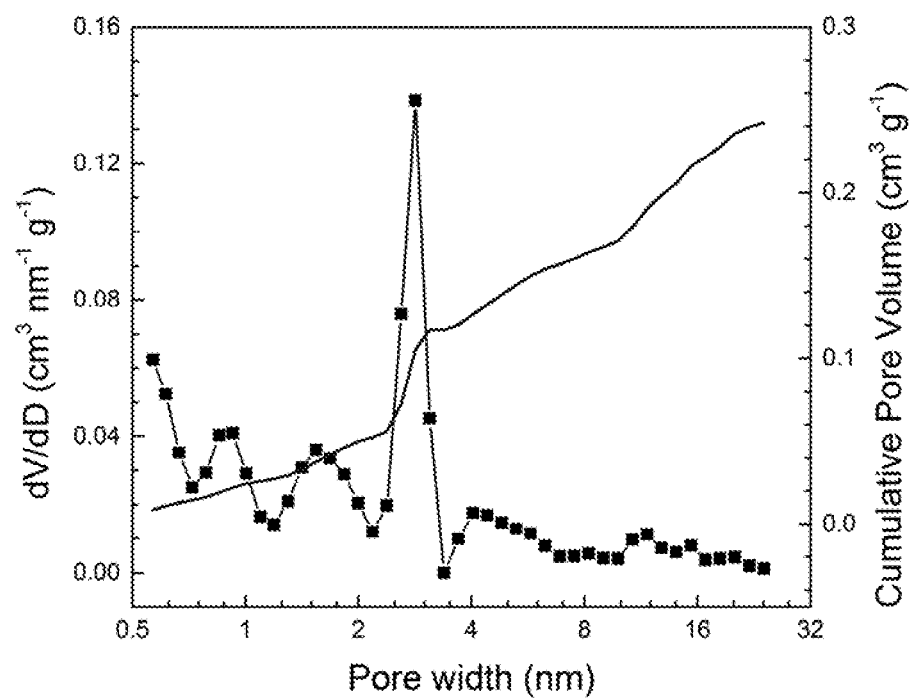
FIG. 1 shows the pore size distribution and pore volume of the SWCNT used in Example 1.

All publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this invention belongs. In case of conflict, the present specification, including definitions, will control.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

The present invention, according to one aspect, relates to an electrode additive comprising an electrochemically active material in a form of one-dimensional molecular chain, wherein the electrochemically active material is contained inside a nanotube-formed conductive shell material. In particular, the electrochemically active material can be "confined" inside a nanotube-formed conductive shell material, so as to maintain its structure of one-dimensional molecular chain.

In accordance with an embodiment of the present invention, said electrochemically active material consists of one element belonging to group VI of the periodic table of elements, i.e., chalcogen elements, such as sulfur, selenium and tellurium. In particular, the nanotube-formed conductive shell material can contain a one-dimensional sulfur chain, a one-dimensional selenium chain or a one-dimensional tellurium chain, and can be present either alone or in mixtures with one another. Preferably said one-dimensional molecular chain exhibits a zigzag and/or linear configuration.

In accordance with another embodiment of the present invention, said conductive shell material can be carbon nanotube, preferably selected from the group consisting of single-walled carbon nanotube (SWCNT), double-walled carbon nanotube (DWCNT), and multi-walled carbon nanotube (MWCNT) having 3-6 walls. Preferably said carbon nanotube can be doped with nitrogen or boron. Preferably said carbon nanotube has a length of 0.5-10 µm, preferable 1-5 µm.

Preferably said carbon nanotube has an inner diameter of 0.5-5 nm, more preferably 0.8-2 nm. As the electrochemically active material in a form of one-dimensional molecular chain is preferably confined inside the carbon nanotube, the configuration of the one-dimensional molecular chain depends on the inner diameter of the carbon nanotube. In particular, the one-dimensional molecular chain becomes straighter, as the inner diameter of the carbon nanotube decreases. Otherwise, if the inner diameter of the carbon nanotube is too great, for example greater than 5 nm, the one-dimensional molecular chain cannot be "confined" inside the carbon nanotube, so that other configuration, such as a ring, might be formed in stead of the one-dimensional molecular chain.

In accordance with another embodiment of the present invention, the content of said electrochemically active material is 1-50 wt. %, preferably 5-20 wt. %, based on the weight of the electrode additive.

The electrode additive according to the present invention can be prepared by a method including the steps of
i) removing the hemispherical end-caps of the nanotube-formed conductive shell material by oxidation under air or oxygen at a temperature of 400-700° C. for 10 min to 1 h to obtain an open-ended nanotube-formed conductive shell material;
ii) incorporating an electrochemically active material into the open-ended nanotube-formed conductive shell material by heating the electrochemically active material together with the open-ended nanotube-formed conductive shell material to a temperature greater than the sublimation point of the electrochemically active material or a temperature from about 400° C. to about 1,000° C. in a closed environment in vacuo or under a pressure of 1 Pa for 24-48 h;
iii) cleaning the exterior surface of the open-ended nanotube-formed conductive shell material by dissolving the excess electrochemically active material deposited on the exterior surface of the open-ended nanotube-formed conductive shell material with a suitable solvent, such as $CS_2$, $CCl_4$, benzene and toluene.

For example, a specific method for removing the hemispherical end-caps of carbon nanotubes has been reported by P. M. Ajayan, et al., Opening Carbon Nanotubes with Oxygen and Implications for filling, Nature, 362, 522-523 (1993), which is incorporated herein by reference in its entirety. For example, a specific method for preparing carbon nanotubes with sulfur chains enclosed in their interior has been disclosed in U.S. Pat. No. 8,663,840 B2, which is incorporated herein by reference in its entirety, and has been reported by Fujimori T, et al., Conducting Linear Chains of Sulphur inside Carbon Nanotubes, Nat Commun. 2013; 4:2162, which is incorporated herein by reference in its entirety. However, neither U.S. Pat. No. 8,663,840 B2 nor Fujimori T discloses or suggests an electrode additive made from carbon nanotubes and sulfur chains. Moreover, U.S. Pat. No. 8,663,840 B2 discloses that elemental sulfur other than a one-dimensional molecular chain of sulfur is deposited within the interior of the hollow carbon nanotubes.

The present invention, according to another aspect, relates to an electrode, which comprises the electrode additive according to the present invention.

In accordance with another embodiment of the present invention, the content of said electrode additive is 1-70 wt. %, preferably 20-40 wt. %, based on the weight of the electrode. The weight of the electrode in the context of the present invention is referred to the weight of the cathode or the anode, excluding the current collector.

In accordance with another embodiment of the present invention, in addition to the electrode additive according to the present invention, said electrode further comprises an electrode active material which is usable in an energy storage system and/or an energy conversion system. Preferably said electrode comprises a sulfur-containing material or a silicon-containing material or a metal chalcogenide, preferably selected from the group consisting of sulfides, oxides, selenides and tellurides, or lithium titanate, as the electrode active material.

In accordance with another embodiment of the present invention, said sulfur-containing material can be selected from the group consisting of elemental sulfur, sulfur-carbon composite, sulfurized polymer, sulfurized polyacrylonitrile, $Li_2S$-carbon composite, and metal sulfides.

The present invention, according to another aspect, relates to a battery, which comprises the electrode according to the present invention.

The present invention, according to another aspect, relates to the use of the electrode additive according to the present invention in an energy storage system or an energy conversion system, preferably in a lithium battery or a sodium battery.

The present invention, according to another aspect, relates to the use of the electrode according to the present invention in an energy storage system or an energy conversion system, preferably in a lithium battery or a sodium battery.

EXAMPLE 1

100 mg of single-wall carbon nanotubes (SWCNTs, Nanjing XFNANO Materials Tech Co. Ltd. China, with a purity of >90%, an inner diameter of 1-2 nm, and a length of 1-3 µm) were used as the nanotube-formed conductive shell material, and heated at 450° C. in a dry air flow for 1 h to remove the terminating caps of SWCNTs. The open-ended SWCNTs were milled with sulfur powder (Aldrich, with a purity of >99.995%) in a mass ratio ($m_C$:$m_S$) of 7:3, and pressed into a pellet. The pellet was sealed in a glass tube in vacuo (<1 Pa) and then calcined at 600° C. for 48 h. The as-obtained sample was milled again and then washed with $CS_2$ to remove excess sulfur outside the SWCNTs. The final S/SWCNTs were obtained by centrifugation and drying in an oven at 50° C.

Evaluations:

FIG. 1 shows the pore width distribution and the cumulative pore volume of the SWCNT used in Example 1.

The sulfur content of the S/SWCNT obtained in Example 1 was measured to be 12.4 wt. % by the CHS elemental analysis.

Figure 2A:
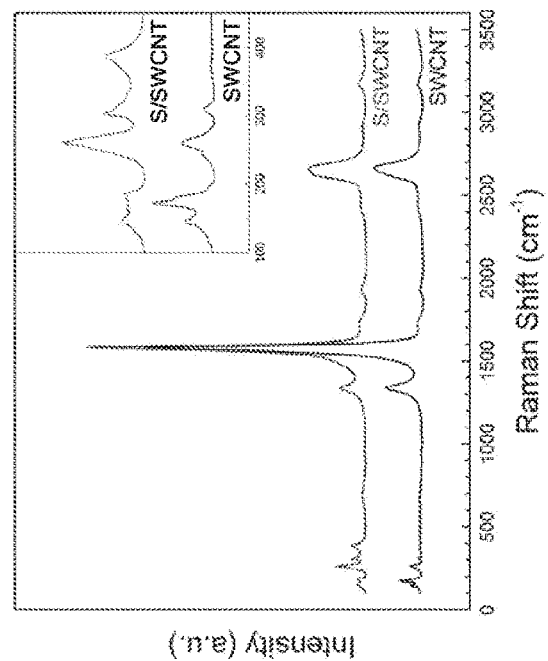
FIG. 2(a) shows the XRD profiles of the SWCNT and the S/SWCNT of Example 1, and a TEM image of the S/SWCNT of Example 1 in the inset (scale bar: 2 nm)
Figure 2B:
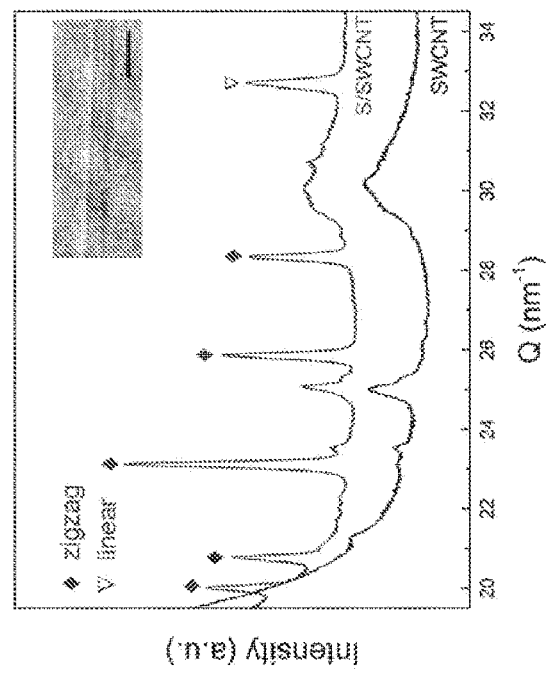
FIG. 2(b) shows the Raman spectra of the SWCNT and the S/SWCNT of Example 1, and their RBM ranges in the inset.

The S/SWCNT obtained in Example 1 shows extinctive XRD peaks, which can be indexed as the Bragg diffraction peaks of sulfur chains (see FIG. 2a), and also shows a distinct Raman peak at 390 $cm^{-1}$, which can be identified as the radical breathing mode (RBM) of sulfur chains (see FIG. 2b).

Electrochemical measurements were performed with coin cells assembled in an argon-filled glovebox. For preparing working electrodes, a mixture of the S/SWCNT obtained in Example 1, carbon black, and poly-(vinyl difluoride) (PVDF) at a weight ratio of 80:10:10 was pasted on an Aluminium foil. Lithium foil was used as the counter electrode. A glass fiber sheet (GF/D, Whatman) was used as a separator. An electrolyte (Zhangjiagang Guotai-Huarong New Chemical Materials Co., Ltd.) consisting of a solution of 1 M $LiN(CF_3SO_2)_2$ (LiTFSI) salt in a mixture of 1,3-dioxolane (DOL) and 1,2-dimethoxy ethane (DME) (1:1, v/v). Galvanostatic cycling of the assembled cells was carried out by using a battery testing system in the voltage range of 1-3 V (vs. $Li^+$/Li).

Figures 3A, 3B:
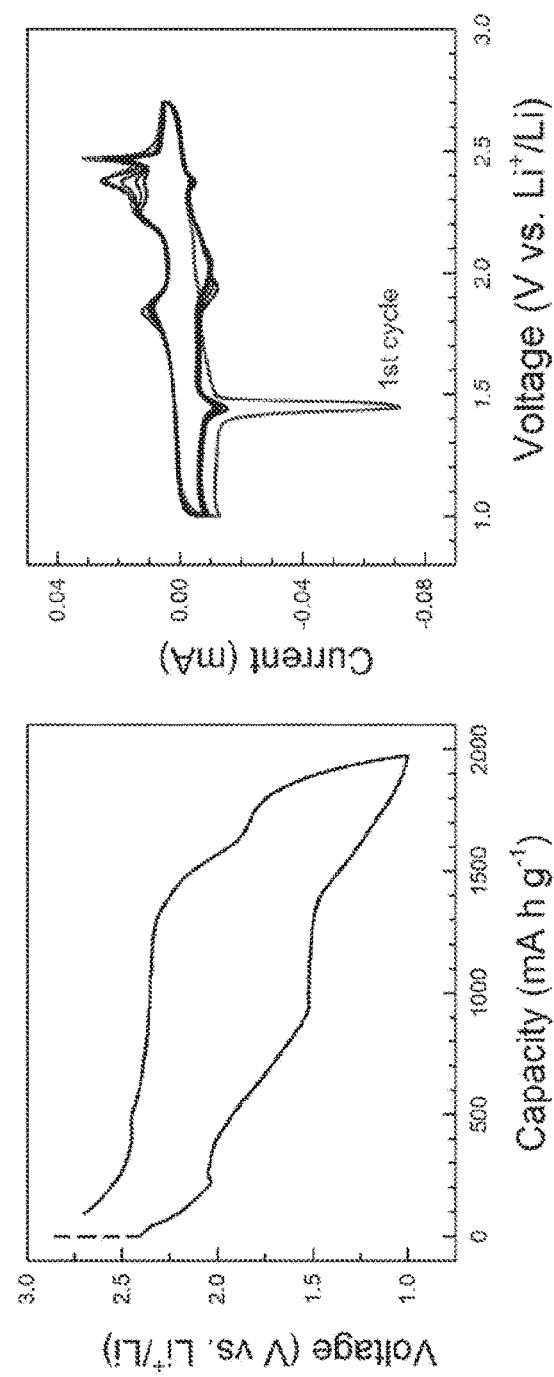
FIG. 3(a) is the initial galvanostatic discharge/charge curve of the S/SWCNT of Example 1 in Li—S batteries.
FIG. 3(b) is the cyclic voltammetry curves of the S/SWCNT of Example 1 in Li—S batteries.

FIG. 3a shows the initial galvanostatic discharge/charge voltage profile of the S/SWCNT obtained in Example 1 at 0.1 C (based on the sulfur in CNT). FIG. 3b shows the cyclic voltammetry curves of the S/SWCNT obtained in Example 1 in the first five cycles at a scan rate of 0.1 mV/s. The discharge/charge voltage profile (FIG. 3a) depicts that the sulfur chains display a high electrochemical activity and a unique discharge plateau at about 1.5 V. The cyclic voltammetry curves also exhibit the 1.5 V reduction peak. This reduction potential is attributed to the long-range ordered sulfur chains.

It can be seen from these measurements that sulfur chains contained inside the carbon nanotubes display a high electrochemical activity and undergo a solid-phase lithiation process.

While certain embodiments have been described, these embodiments have been presented by way of example only, and are not intended to limit the scope of the inventions. The attached claims and their equivalents are intended to cover all the modifications, substitutions and changes as would fall within the scope and spirit of the invention.

The invention claimed is:

1. An electrode comprising an electrode additive comprising an electrochemically active material in a form of a one-dimensional molecular sulfur chain and a carbon nanotube-formed conductive shell material, wherein the electrochemically active material is contained inside the carbon nanotube-formed conductive shell material, wherein the carbon nanotube has an inner diameter of 0.8-2 nm and the one dimensional molecular sulfur chain exhibits a zigzag and/or linear configuration.

2. The electrode of claim 1, characterized in that the carbon nanotube is doped with nitrogen or boron.

3. The electrode of claim 1, characterized in that the content of the electrochemically active material in the electrode additive is 1-50 wt. % based on the weight of the electrode additive.

4. The electrode of claim 1, characterized in that the content of the electrode additive in the electrode is 1-70 wt. % based on the weight of the electrode.

5. The electrode of claim 1, characterized in that in addition to the electrode additive, the electrode further comprises an electrode active material usable in an energy storage system and/or an energy conversion system.

6. The electrode of claim 5, characterized in that the electrode active material is a sulfur-containing material is selected from the group consisting of elemental sulfur, sulfur-carbon composite, sulfurized polymer, sulfurized polyacrylonitrile, $Li_2S$-carbon composite, and metal sulfides.

7. The electrode of claim 5, characterized in that the electrode active material is a silicon-containing material, a metal chalcogenide and/or lithium titanate.

8. A battery comprising the electrode of claim 1.

9. The electrode of claim 1, characterized in that the carbon nanotube is selected from the group consisting of a single-walled carbon nanotube, a double-walled carbon nanotube, and a multi-walled carbon nanotube having 3-6 walls.

10. The electrode of claim 1, characterized in that the content of the electrochemically active material in the electrode additive is 5-20 wt. % based on the weight of the electrode additive.

11. The electrode of claim 1, characterized in that the content of the electrode additive in the electrode is 20-40 wt. %, based on the weight of the electrode.

* * * * *